(12) United States Patent
Nemer et al.

(10) Patent No.: US 11,553,386 B2
(45) Date of Patent: *Jan. 10, 2023

(54) SYSTEMS AND METHODS OF MANAGING COMMUNICATION ENDPOINTS

(71) Applicant: iNEMSOFT, Inc., Frisco, TX (US)

(72) Inventors: Allen Nemer, Plano, TX (US); Todd Lehmann, Allen, TX (US); Wei Zhao, Allen, TX (US); Shaldon Li, Plano, TX (US)

(73) Assignee: iNEMSOFT, Inc., Frisco, TX (US)

( * ) Notice: Subject to any disclaimer, the term of this patent is extended or adjusted under 35 U.S.C. 154(b) by 116 days.

This patent is subject to a terminal disclaimer.

(21) Appl. No.: 17/106,791

(22) Filed: Nov. 30, 2020

(65) Prior Publication Data
US 2021/0084553 A1 Mar. 18, 2021

Related U.S. Application Data

(63) Continuation of application No. 16/454,711, filed on Jun. 27, 2019, now Pat. No. 10,939,342, which is a
(Continued)

(51) Int. Cl.
*H04W 36/08* (2009.01)
*H04L 29/08* (2006.01)
(Continued)

(52) U.S. Cl.
CPC ......... *H04W 36/08* (2013.01); *H04L 41/0668* (2013.01); *H04L 41/0893* (2013.01);
(Continued)

(58) Field of Classification Search
CPC .... H04W 36/08; H04W 60/04; H04L 67/563; H04L 67/63; H04L 67/00; H04L 67/34; H04L 41/0668; H04L 41/0893
See application file for complete search history.

(56) References Cited

U.S. PATENT DOCUMENTS 7,962,582 B2 6/2011 Potti et al.
7,996,463 B2 8/2011 Mousseau et al.
(Continued)

FOREIGN PATENT DOCUMENTS

CN 101741840 A 6/2010
CN 101945013 A 1/2011
(Continued)

OTHER PUBLICATIONS

Cisco Systems, Inc., "Chapter 2: IP Telephony Deployment Models," Cisco Unified Communications SRND (Based on Cisco Unified CallManager 4.x); last revised on Feb. 13, 2008, 28 pages.
(Continued)

*Primary Examiner* — Melvin C Marcelo
(74) *Attorney, Agent, or Firm* — Shackelford, Bowen, McKinley & Norton, LLP

(57) ABSTRACT

In one embodiment, a method includes receiving a trigger to dynamically modify a serving site of a communication endpoint, wherein the communication endpoint is registered to receive digital communication service from a first serving site. The method further includes determining a stored serving-site selection policy applicable to the communication endpoint. The method also includes selecting a second serving site for the communication endpoint based, at least part, on a stored serving-site selection policy. Also, the method includes determining endpoint-configuration requirements of the second serving site. Furthermore, the method includes dynamically generating endpoint configurations that satisfy the endpoint-configuration requirements of the second serving site. Moreover, the method includes writing the generated endpoint configurations to the communication endpoint. Additionally, the method includes causing the communication endpoint to register to receive
(Continued)

digital communication service from the second serving site in place of the first serving site.

15 Claims, 7 Drawing Sheets

Related U.S. Application Data continuation of application No. 16/027,888, filed on Jul. 5, 2018, now abandoned, which is a continuation of application No. 15/412,411, filed on Jan. 23, 2017, now Pat. No. 10,021,610, which is a continuation of application No. 14/854,370, filed on Sep. 15, 2015, now Pat. No. 9,591,049.

(60) Provisional application No. 62/051,067, filed on Sep. 16, 2014.

(51) Int. Cl.

| | | |
|---|---|---|
| *H04L 12/24* | (2006.01) | |
| *H04W 60/04* | (2009.01) | |
| *H04L 67/00* | (2022.01) | |
| *H04L 41/0668* | (2022.01) | |
| *H04L 41/0893* | (2022.01) | |
| *H04L 67/63* | (2022.01) | |
| *H04L 67/563* | (2022.01) | |

(52) U.S. Cl.
CPC ............ *H04L 67/00* (2013.01); *H04L 67/34* (2013.01); *H04L 67/563* (2022.05); *H04L 67/63* (2022.05); *H04W 60/04* (2013.01)

(56) References Cited

U.S. PATENT DOCUMENTS

| | | |
|---|---|---|
| 8,199,670 B2 | 6/2012 | Mishra et al. |
| 8,239,915 B1 | 8/2012 | Satish et al. |
| 8,487,975 B2 | 7/2013 | King et al. |
| 8,527,656 B2 | 9/2013 | Baker et al. |
| 8,553,854 B1 | 10/2013 | Weaver et al. |
| 8,717,950 B2 | 5/2014 | Ravindranath et al. |
| 9,363,177 B2 | 6/2016 | Brady et al. |
| 9,591,049 B2 | 3/2017 | Nemer et al. |
| 9,712,392 B2 | 7/2017 | Cai et al. |
| 9,866,699 B2 | 1/2018 | Kleiner et al. |
| 2006/0155862 A1 | 7/2006 | Kathi et al. |
| 2007/0156919 A1 | 7/2007 | Potti et al. |
| 2008/0317004 A1 | 12/2008 | Cai et al. |
| 2013/0067099 A1 | 3/2013 | Ravindranath et al. |
| 2013/0325986 A1 | 12/2013 | Brady et al. |
| 2014/0122670 A1 | 5/2014 | Levy et al. |

FOREIGN PATENT DOCUMENTS

| | | | | |
|---|---|---|---|---|
| CN | 102547660 A | | 7/2012 | |
| CN | 102970379 A | | 3/2013 | |
| EP | 3896572 A1 | * | 10/2021 | .......... G06F 11/0757 |
| RU | 2468532 C2 | | 11/2012 | |
| WO | WO-2013113181 A1 | | 8/2013 | |

OTHER PUBLICATIONS

Cisco Systems, Inc., "Administration Guide for Cisco Unified ICM/Contact Center Enterprise & Hosted Release 8.x," Jul. 2011,92 pages.
Cisco Systems, Inc., "Cisco Unified Survivable Remote Site Telephony (SRST) and Cisco Enhanced SRST (E-SRST)," Jun. 2014, 16 pages.
Cisco Systems, Inc., "Chapter 23: Managing Endpoints in Network Manager," Configuration Guide for Cisco Unified Videoconferencing Manager Release 7.0, Aug. 2009, 12 pages.
Avaya, Inc., "iNEMSOFT CLASSONE iCAS, Interoperability and Collaboration Application Server," Version 3, Feb. 24, 2014, 81 pages.
Nemer, Allen, "U.S. Appl. No. 15/699,044," filed Sep. 8, 2017.
Polycom, "Polycom® RealPresence® Resource Manager System," Operations Guide, 8.1.0, Dec. 2013, 3725-72104-001E, 508 pages.
Polycom, "Polycom® RealPresence® Resource Manager System," Operations Guide, 8.2.0, Jul. 2014, 3725-72104-001F, 491 pages.
Polycom, "Polycom® RealPresence® Resource Manager System," Operation Guide 8.4.0, Jun. 2015, 516 pages.
Polycom®, "RealPresence Resource Manager System," Release Notes, 8.4.0, Jul. 2015, 3725-72100-001 Rv M1, 21 pages.
Polycom, "Configuring Optional Re-Registration on Failover Behavior," Engineering Advisory 66546, Jul. 2012, 10 pages.
Polycom, Technical Bulletin 5844, May 2012, 9 pages.

* cited by examiner

SYSTEMS AND METHODS OF MANAGING COMMUNICATION ENDPOINTS

CROSS-REFERENCE TO RELATED APPLICATIONS

This patent application is a continuation of U.S. patent application Ser. No. 16/454,711, filed on Jun. 27, 2019. U.S. patent application Ser. No. 16/454,711 is a continuation of U.S. patent application Ser. No. 16/027,888, filed on Jul. 5, 2018. U.S. patent application Ser. No. 16/027,888 is a continuation of U.S. patent application Ser. No. 15/412,411, filed on Jan. 23, 2017. U.S. patent application Ser. No. 15/412,411 is a continuation of U.S. patent application Ser. No. 14/854,370, filed on Sep. 15, 2015. U.S. patent application Ser. No. 14/854,370 claims priority from U.S. Provisional Patent Application No. 62/051,067, filed on Sep. 16, 2014. U.S. patent application Ser. No. 16/454,711, U.S. patent application Ser. No. 16/027,888, U.S. patent application Ser. No. 15/412,411, U.S. patent application Ser. No. 14/854,370, and U.S. Provisional Patent Application No. 62/051,067 are hereby incorporated by reference.

BACKGROUND

Technical Field

The present disclosure relates generally to network communication and more particularly, but not by way of limitation, to systems and methods for managing communication endpoints.

History of Related Art

The communication endpoint—whether legacy analog, digital or Internet Protocol (IP)—can be a critical asset within any enterprise. Telephones are a vehicle for communicating among the enterprise, its personnel and customers. Securing, provisioning, maintaining and managing these assets can be just as critical as high availability and disaster recovery. Some high-value lines of business and their revenues depend directly on a direct telephone call with customers, partners or employees. In essence, telephones can impact business users, operations and contact centers, with consequences to revenues and to customer and employee satisfaction. Rapid changes in endpoint hardware, firmware and communications server make communication endpoints difficult to control, maintain and recover.

SUMMARY OF THE INVENTION

In one embodiment, a method is performed by a computer system. The method includes receiving a trigger to dynamically modify a serving site of a communication endpoint, wherein the communication endpoint is registered to receive digital communication service from a first serving site. The method further includes determining a stored serving-site selection policy applicable to the communication endpoint. The method also includes accessing the stored serving-site selection policy. In addition, the method includes selecting a second serving site for the communication endpoint from among a plurality of alternative serving sites, wherein the selection is based, at least part, on the stored serving-site selection policy. Also, the method includes determining endpoint-configuration requirements of the second serving site based, at least in part, on a stored profile of the second serving site. Furthermore, the method includes dynamically generating endpoint configurations that satisfy the endpoint-configuration requirements of the second serving site. Moreover, the method includes writing the generated endpoint configurations to the communication endpoint. Additionally, the method includes causing the communication endpoint to register to receive digital communication service from the second serving site in place of the first serving site.

In one embodiment, a system includes at least one processor. The at least one processor is operable to perform a method. The method includes receiving a trigger to dynamically modify a serving site of a communication endpoint, wherein the communication endpoint is registered to receive digital communication service from a first serving site. The method further includes determining a stored serving-site selection policy applicable to the communication endpoint. The method also includes accessing the stored serving-site selection policy. In addition, the method includes selecting a second serving site for the communication endpoint from among a plurality of alternative serving sites, wherein the selection is based, at least part, on the stored serving-site selection policy. Also, the method includes determining endpoint-configuration requirements of the second serving site based, at least in part, on a stored profile of the second serving site. Furthermore, the method includes dynamically generating endpoint configurations that satisfy the endpoint-configuration requirements of the second serving site. Moreover, the method includes writing the generated endpoint configurations to the communication endpoint. Additionally, the method includes causing the communication endpoint to register to receive digital communication service from the second serving site in place of the first serving site.

In one embodiment, a computer-program product includes a non-transitory computer-usable medium having computer-readable program code embodied therein. The computer-readable program code adapted to be executed to implement a method. The method includes receiving a trigger to dynamically modify a serving site of a communication endpoint, wherein the communication endpoint is registered to receive digital communication service from a first serving site. The method further includes determining a stored serving-site selection policy applicable to the communication endpoint. The method also includes accessing the stored serving-site selection policy. In addition, the method includes selecting a second serving site for the communication endpoint from among a plurality of alternative serving sites, wherein the selection is based, at least part, on the stored serving-site selection policy. Also, the method includes determining endpoint-configuration requirements of the second serving site based, at least in part, on a stored profile of the second serving site. Furthermore, the method includes dynamically generating endpoint configurations that satisfy the endpoint-configuration requirements of the second serving site. Moreover, the method includes writing the generated endpoint configurations to the communication endpoint. Additionally, the method includes causing the communication endpoint to register to receive digital communication service from the second serving site in place of the first serving site.

BRIEF DESCRIPTION OF THE DRAWINGS

A more complete understanding of the method and apparatus of the present disclosure may be obtained by reference to the following Detailed Description when taken in conjunction with the accompanying Drawings wherein.

DETAILED DESCRIPTION

Figure 1:
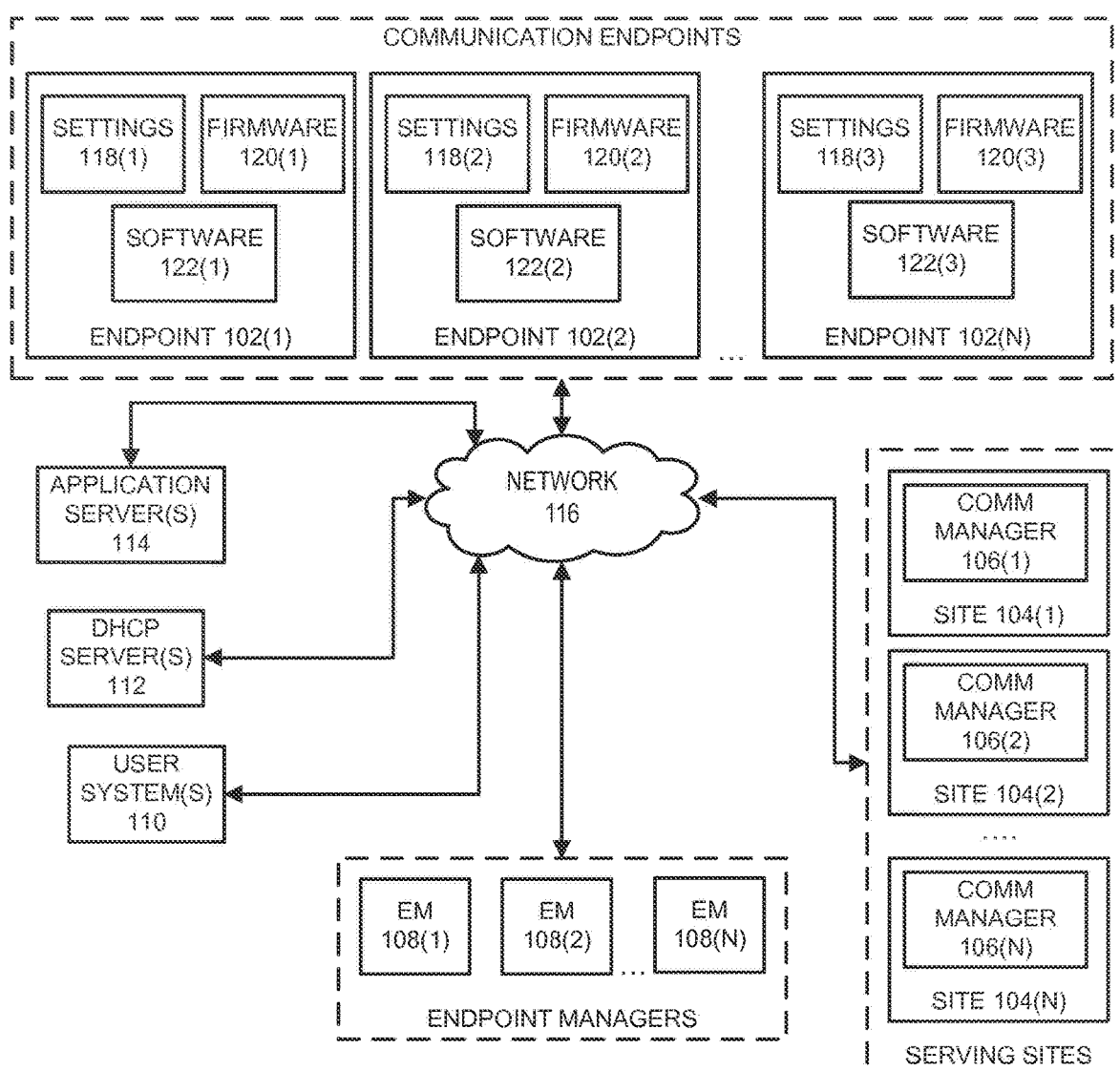
FIG. 1 illustrates an example of a system for managing communication endpoints.

FIG. 1 illustrates an example of a system 100 for managing communication endpoints. The system 100 includes communication endpoints 102(1), 102(2) and 102(N) (collectively, communication endpoints 102), serving sites 104(1), 104(2) and 104 (N) (collectively, serving sites 104) and endpoint managers 108(1), 108(2) and 108(N). The system 100 also includes one or more user systems 110, one or more Dynamic Host Configuration Protocol (DHCP) servers 112 and one or more application servers 114. In certain embodiments, the communication endpoints 102, the serving sites 104, the endpoint managers 108, the user system(s) 110, the DHCP server(s) 112 and the application server(s) 114 are operable to communicate over a network 116.

In general, the communication endpoints 102 can each receive and transmit digital communication such as, for example, audio and/or video, as Internet Protocol (IP) packets over the network 116, which can include one or more packet-switched networks. In certain embodiments, the communication endpoints 102 can be configured to implement Voice over Internet Protocol (VoIP). For example, the communication endpoints 102 can implement VoIP protocols such as H.323, Media Gateway Control Protocol (MGCP), Session Initiation Protocol (SIP), H.248, Real-time Transport Control Protocol (RTCP), Real-time Transport Control Protocol (RTCP), Secure Real-time Transport Protocol (SRTP), Session Description Protocol (SDP), Inter Asterisk eXchange (IAX), Jingle XMPP VoIP extensions, Skype protocol, Teamspeak, combinations of same and/or the like.

Examples of communication endpoints 102 include a cellular phone, a smart phone, a two-way land mobile radio, a radio base station controller, a wearable or body-borne computer, a session initiation protocol (SIP) phone, a desktop computer, a laptop computer, a tablet computer, a personal digital assistant (PDA), a global positioning system, a multimedia device, a video device, a digital audio player (e.g., MP3 player), a camera, a game console, a set-top box, car any other similar functioning device. A particular communication endpoint may also be referred to by those skilled in the art as a mobile station, a subscriber station, a mobile unit, a subscriber unit, a wireless unit, a remote unit, a mobile device, a wireless device, a wireless communications device, a user device, an end-user device, a remote device, a mobile subscriber station, an access terminal, a mobile terminal, a wireless terminal, a remote terminal, a handset, a user agent, a mobile client, a client, or as some other suitable term. For illustrative purposes, examples will be described herein in which the communication endpoints 102 are IP phones or SIP phones. However, it should be appreciated that the principles described herein are not limited to these example implementations.

The communication endpoints 102(1), 102(2) and 102(N) are shown to include endpoint configurations that include settings 118(1), 118(2) and 118(N), respectively (collectively, settings 118), firmware 120(1), 120(2) and 120(N), respectively (collectively, firmware 120) and application software 122(1), 122(2) and 122(3), respectively (collectively, application software 122). The settings 118 can each include, for example, configuration parameters that enable the respective communication endpoint of the communication endpoints 102 to operate and communicate with one or more of the serving sites 104. In some implementations, the settings 118 can include security profiles and security certificates. In certain embodiments, the settings 118 can be encapsulated in settings files. In an example, the settings 118 can reference a serving site of the serving sites 104 that is providing digital communication service to a given communication endpoint. The firmware 120 can be a low-level control program in memory of the communication endpoints 102. In an example, the firmware 120 can reside in read-only memory (ROM), erasable programmable read-only memory (EPROM), or flash memory. In various cases, the application software 122 can be a program designed to run in respective operating-system environments of the communication endpoints 102.

In general, the serving sites 104 are locations that can serve and process digital communication, such as voice communication resulting from telephone calls, which are directed to the communication endpoints 102. The serving sites 104(1), 104(2) and 104(N) are shown to include communication managers 106(1), 106(2) and 106(N), respectively (collectively, communication managers 106). The communication managers 106 can each function as a communication server, such as a call server, that can provide digital communication service, such as VoIP service, to communication endpoints such as the communication endpoints 102. In a typical embodiment, the communication endpoints 102 can each register with a particular serving site of the serving sites 104 to receive communication services provided thereby.

As will be described in greater detail with respect to FIG. 3, the endpoint managers 108 can involve many different application services, which services can be loaded and managed on single or multiple host servers. In certain embodiments, the application server(s) 114 can facilitate distributed deployments of the endpoint managers 108 through host server and process replication. In addition, the application server(s) 114 can facilitate communication between the communication managers 106 of the serving sites 104 and the endpoint managers 108 during performance of the application services by providing a common interface therebetween. In embodiments in which the application server(s) include more than one server, the application server(s) 114 can be colocated or geographically distributed. The replicated and distributed configuration of the application server(s) 114 can provide a foundation for failover, recovery and self-healing. In certain embodiments, endpoint-management application services and processes can be dynamically loaded, configured, initialized, enabled, disabled and unloaded by an administration component of the endpoint managers 108.

The endpoint managers 108 can centrally administer the communication endpoints 102 and control to which serving site of the serving sites 104 the communication endpoints 102 are registered at a given time. For example, in various embodiments, the endpoint managers 108 can administer the communication endpoints 102 in relation to a configurable endpoint-management hierarchy. In an example, the configurable endpoint-management hierarchy can be configured to match a given company or enterprise's lines of business.

According to this example, a line of business (LOB) could be a business unit of the company or enterprise that specific functions.

In various cases, each node of an endpoint-management hierarchy can be an individually manageable grouping of users and their communication endpoints. For example, a given endpoint-management hierarchy for a banking enterprise might include categories for credit card services, residential banking, mortgage banking, and customer service. According to this example, each communication endpoint of the communication endpoints 102 can be a child node of one of these categories. For instance, a communication endpoint assigned to a user in a residential banking division of the banking enterprise can belong to, or be a child node of, the "residential banking" category of the endpoint-management hierarchy. In similar fashion, all other communication endpoints of the banking enterprise can belong to, or be child nodes of, particular categories of the endpoint management hierarchy in correspondence to their assigned users. It should be appreciated that, in various cases, the communication endpoints of a given category can be distributed across physical locations throughout the world. An example of an endpoint-management hierarchy will be described in relation to FIG. 4.

In various embodiments, the endpoint managers 108 maintain a configurations repository that can include settings, configurations, security certificates, firmware and/or software usable by the communication endpoints 102. In certain embodiments, the endpoint managers 108, can receive a trigger to dynamically modify a serving site of a selected set of one or more of the communication endpoints 102. In some cases, the selected set can be a particular category or node of an endpoint-management hierarchy as described above. In response to the trigger, the endpoint managers 108 can invoke a process that causes the selected set of the communication endpoints 102 to register to receive digital communication service from a different serving site of the serving sites 104. Example implementations and operation of the endpoint managers 108 will be described in relation to FIGS. 3-7.

One of ordinary skill in the art will appreciate that each instance of a computer or computer system as described above may be representative of any number of physical or virtual server computers. Likewise, each instance of a database may be representative of a plurality of databases. In addition, it should be appreciated that, in various embodiments, each instance of a network such as, for example, the network 116, can be viewed as an abstraction of multiple distinct networks. For example, the network 116 can include one or multiple communications networks such as, for example, public or private intranets, a public switch telephone network (PSTN), a cellular network, the Internet, and/or the like.

The DHCP server(s) 112 can be used to assign IP addresses and other parameters to the communication endpoints 102 on an as-needed basis. In various embodiments, the DHCP server(s) 112 eliminates the need to manually configure each communication endpoint with a static IP address. Advantageously, in certain embodiments, the DHCP server(s) 112 can also pass information to the communication endpoints 102 such as, for example, IP addresses associated with one or more of the communication managers 106, a file server or other component of the endpoint managers 108, etc. Table 1 below lists examples of parameters and settings that, in some implementations, can be provided to one or more of the communication endpoints 102 by the DHCP server(s) 112.

TABLE 1

Communication endpoint IP address range
Subnet mask (e.g., DHCP Option 1)
Router (Gateway) IP address (e.g., DHCP Option 3)
DNS server IP address (e.g., DHCP Option 6)
DNS domain name (e.g., DHCP option 15)
HTTP file server IP address (e.g., DHCP Option 176 [Site-Specific Option Number (SSON)])
HTTPS and TLS IP addresses if applicable (e.g., DHCP Option 176 [Site-Specific Option Number (SSON)]

The user system(s) 110 can be a computer system usable by an administrator, super user or other user to access one or more of the endpoint managers 108. The user system(s) can be a cellular phone, a smart phone, a two-way land mobile radio, a radio base station controller, a wearable or body-borne computer, a desktop computer, a laptop computer, a tablet computer, a personal digital assistant (PDA), combinations of same and/or the like. In certain embodiments, the user system(s) 110 is an example of a computer system that can be used to administer the communication endpoints 102. For example, in various embodiments, the user system(s) 110 can access a web interface, an application programming interface (API) or other interface of one or more of the endpoint managers 108 for purposes of triggering a dynamic modification to a serving site of one or more of the communication endpoints 102.

Figure 2:
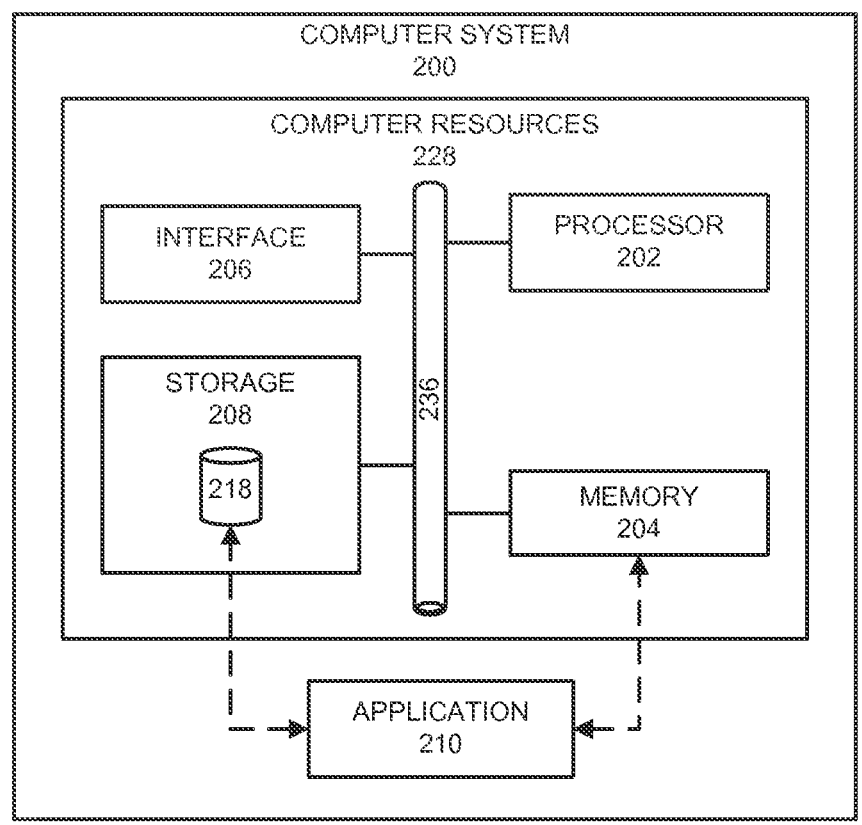
FIG. 2 illustrates an example of an computer system.

FIG. 2 illustrates an example of a computer system 200. In various embodiments, one or more computer systems similar to the computer system 200 can be included within, or implement, the communication endpoints 102, the communication managers 106, the endpoint managers 108, the user system(s) 110, the DHCP server(s) 112 and/or the application server(s) 114, components of same, computer systems communicating with any of the foregoing and/or the like. The computer system 200 includes an application 210 operable to execute on computer resources 228. In particular embodiments, one or more instances of the computer system 200 may perform one or more steps of one or more methods described or illustrated herein. In particular embodiments, one or more computer systems may provide functionality described or illustrated herein. In particular embodiments, encoded software running on one or more computer systems may perform one or more steps of one or more methods described or illustrated herein or provide functionality described or illustrated herein.

The components of the computer system 200 may comprise any suitable physical form, configuration, number, type and/or layout. As an example, and not by way of limitation, the computer system 200 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a wearable or body-borne computer, a server, or a combination of two or more of these. Where appropriate, the computer system 200 may include one or more computer systems; be unitary or distributed; span multiple locations; span multiple machines; or reside in a cloud, which may include one or more cloud components in one or more networks. For example, in certain embodiments, all or part of the endpoint managers 108 or the serving sites 104 can reside in a cloud.

In the depicted embodiment, the computer system 200 includes a processor 202, memory 204, storage 208, interface 206, and bus 236. Although a particular computer system is depicted having a particular number of particular components in a particular arrangement, this disclosure contemplates any suitable computer system having any suitable number of any suitable components in any suitable arrangement.

Processor 202 may be a microprocessor, controller, or any other suitable computing device, resource, or combination of hardware, software and/or encoded logic operable to execute, either alone or in conjunction with other components, (e.g., memory 204), the application 210. Such functionality may include providing various features discussed herein. In particular embodiments, processor 202 may include hardware for executing instructions, such as those making up the application 210. As an example and not by way of limitation, to execute instructions, processor 202 may retrieve (or fetch) instructions from an internal register, an internal cache, memory 204, or storage 208; decode and execute them; and then write one or more results to an internal register, an internal cache, memory 204, or storage 208.

In particular embodiments, processor 202 may include one or more internal caches for data, instructions, or addresses. This disclosure contemplates processor 202 including any suitable number of any suitable internal caches, where appropriate. As an example and not by way of limitation, processor 202 may include one or more instruction caches, one or more data caches, and one or more translation lookaside buffers (TLBs). Instructions in the instruction caches may be copies of instructions in memory 204 or storage 208 and the instruction caches may speed up retrieval of those instructions by processor 202. Data in the data caches may be copies of data in memory 204 or storage 208 for instructions executing at processor 202 to operate on; the results of previous instructions executed at processor 202 for access by subsequent instructions executing at processor 202, or for writing to memory 204, or storage 208; or other suitable data. The data caches may speed up read or write operations by processor 202. The TLBs may speed up virtual-address translations for processor 202. In particular embodiments, processor 202 may include one or more internal registers for data, instructions, or addresses. Depending on the embodiment, processor 202 may include any suitable number of any suitable internal registers, where appropriate. Where appropriate, processor 202 may include one or more arithmetic logic units (ALUs); be a multi-core processor; include one or more processors 202; or any other suitable processor.

Memory 204 may be any form of volatile or non-volatile memory including, without limitation, magnetic media, optical media, random access memory (RAM), read-only memory (ROM), flash memory, removable media, or any other suitable local or remote memory component or components. In particular embodiments, memory 204 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 204 may include one or more memories 204, where appropriate. Memory 204 may store any suitable data or information utilized by the computer system 200, including software embedded in a computer readable medium, and/or encoded logic incorporated in hardware or otherwise stored (e.g., firmware). In particular embodiments, memory 204 may include main memory for storing instructions for processor 202 to execute or data for processor 202 to operate on. In particular embodiments, one or more memory management units (MMUs) may reside between processor 202 and memory 204 and facilitate accesses to memory 204 requested by processor 202.

As an example and not by way of limitation, the computer system 200 may load instructions from storage 208 or another source (such as, for example, another computer system) to memory 204. Processor 202 may then load the instructions from memory 204 to an internal register or internal cache. To execute the instructions, processor 202 may retrieve the instructions from the internal register or internal cache and decode them. During or after execution of the instructions, processor 202 may write one or more results (which may be intermediate or final results) to the internal register or internal cache. Processor 202 may then write one or more of those results to memory 204. In particular embodiments, processor 202 may execute only instructions in one or more internal registers or internal caches or in memory 204 (as opposed to storage 208 or elsewhere) and may operate only on data in one or more internal registers or internal caches or in memory 204 (as opposed to storage 208 or elsewhere).

In particular embodiments, storage 208 may include mass storage for data or instructions. As an example and not by way of limitation, storage 208 may include a hard disk drive (HDD), a floppy disk drive, flash memory, an optical disc, a magneto-optical disc, magnetic tape, or a Universal Serial Bus (USB) drive or a combination of two or more of these. Storage 208 may include removable or non-removable (or fixed) media, where appropriate. Storage 208 may be internal or external to the computer system 200, where appropriate. In particular embodiments, storage 208 may be non-volatile, solid-state memory. In particular embodiments, storage 208 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 208 may take any suitable physical form and may comprise any suitable number or type of storage. Storage 208 may include one or more storage control units facilitating communication between processor 202 and storage 208, where appropriate. In addition, in certain embodiments, the application 210 is operable to establish, or update, configurations in a data store 218 on the storage 208. The data store 218 can be a database, flat file, and/or the like. The configurations can include, for example, any data described herein as being stored in a data store.

In particular embodiments, interface 206 may include hardware, encoded software, or both providing one or more interfaces for communication (such as, for example, packet-based communication) among any networks, any network devices, and/or any other computer systems. As an example and not by way of limitation, communication interface 206 may include a network interface controller (NIC) or network adapter for communicating with an Ethernet or other wire-based network and/or a wireless NIC (WNIC) or wireless adapter for communicating with a wireless network.

Depending on the embodiment, interface 206 may be any type of interface suitable for any type of network for which computer system 200 is used. As an example and not by way of limitation, computer system 200 can include (or communicate with) an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 200 can include (or communicate with) a wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. By way of further example, the interface 206 can utilize communication via various other types of wireless communication such as infrared (IR) communication, radio frequency (RF) communication, communication via direct electrical connections, etc. In general, the computer system 200 may include any suitable interface 206 for any one or more of these networks, where appropriate.

In some embodiments, interface 206 may include one or more interfaces for one or more I/O devices. One or more of these I/O devices may enable communication between a person and the computer system 200. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. Particular embodiments may include any suitable type and/or number of I/O devices and any suitable type and/or number of interfaces 206 for them. Where appropriate, interface 206 may include one or more drivers enabling processor 202 to drive one or more of these I/O devices. Interface 206 may include one or more interfaces 206, where appropriate.

Bus 236 may include any combination of hardware, software embedded in a computer readable medium, and/or encoded logic incorporated in hardware or otherwise stored (e.g., firmware) to couple components of the computer system 200 to each other. As an example and not by way of limitation, bus 236 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 236 may include any number, type, and/or configuration of buses 236, where appropriate. In particular embodiments, one or more buses 236 (which may each include an address bus and a data bus) may couple processor 202 to memory 204. Bus 236 may include one or more memory buses.

Herein, reference to a computer-readable storage medium encompasses one or more tangible computer-readable storage media possessing structures. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of processor 202 (such as, for example, one or more internal registers or caches), one or more portions of memory 204, one or more portions of storage 208, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more APIs stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, C++, Python, Java, Swift, or a suitable extension thereof. In particular embodiments, encoded software is expressed in a lower-level programming language, such as assembly language (or machine code). In particular embodiments, encoded software is expressed in Hyper Text Markup Language (HTML), Extensible Markup Language (XML), or other suitable markup language. In particular embodiments, encoded software is expressed in a higher-level scripting language, such as Perl or JavaScript.

Figure 3:
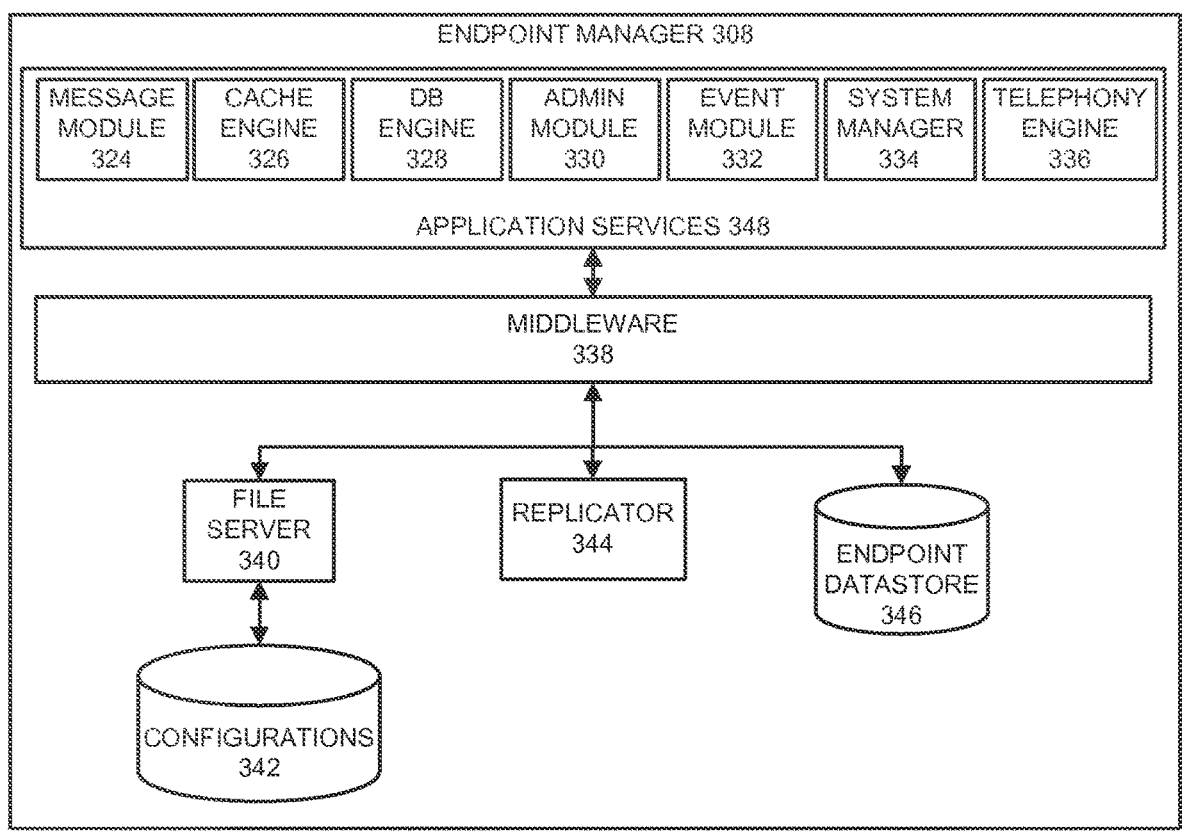
FIG. 3 illustrates an example of an endpoint manager.

FIG. 3 illustrates an example of an endpoint manager 308. In general, the endpoint manager 308 can be considered an example implementation of the endpoint managers 108 of FIG. 1. The endpoint manager 308 can include application services 348. In various embodiments, the application services 348 can be facilitated by an application server such as the application server(s) 114 of FIG. 1. In the illustrated embodiment, the application services 348 include a message module 324, a cache engine 326, a database engine 328, an administration module 330, an event module 332, a system manager 334, and a telephony engine 336. The endpoint manager 308 can further include middleware 338, a file server 340, configurations 342, a replicator 344 and one or more data stores 346. The middleware 338 can be a middle tier that facilitates interoperability of the application services 348. In some embodiments, the middleware 338 can expose an API.

With reference to the application services 348, in certain embodiments, the message module 324 is operable to push messages to communication endpoints such as the communication endpoints 102 of FIG. 1. In various embodiments, the messages can take the form of text messages published to a display of the communication endpoints, audio messages, video messages, combinations of same and/or the like.

The cache engine 326 can function as a database memory cache and holds shared and runtime data for other server instances within the system. Runtime and shared data can include transient, critical and operational data structures. In some implementations, the cache engine 326 can be configured to run with one or multiple instances on local or remote nodes. In some embodiments, the failover of the cache engine 326 is transparent and does not impact functionality of the endpoint manager 308. In an example, one instance of the cache engine 326 could be configured for each of the application server(s) 114 of FIG. 1. In another example, two instances of the cache engine 326 can be used to provide high availability. In some embodiments, the database engine 328 can provide failover in the event that all instances of the cache engine 326 become unavailable.

The database engine 328 can be used to provide a permanent repository for the system configuration and operation, alarms and reporting, endpoint configuration, user authentications, serving sites and lines of business (sometimes referred to herein as a primary database). The database engine 328 can house such data, for example, in the data store(s) 346. The database engine 328 can store in the data store(s) 346 data such as, for example, administration and configuration data, information related to system or service failure alarms, and any information needed for reporting.

In another example, the database engine 328 can store in the data store(s) 346 an endpoint profile for each of the communication endpoints 102. The endpoint profiles can identify the communication endpoints and indicate a policy for selecting a serving site of the serving sites 104. In some cases, each policy can include a rule or set of rules for selecting an alternative serving site when a preferred serving site of the serving sites 104 is down.

In yet another example, the database engine 328 can store in the data store(s) 346 a category profile for each category of an endpoint-management hierarchy. The category profile can identify the category (e.g., "residential banking) and indicate a policy for selecting a serving site of the serving sites 104. In some cases, each policy can include a rule or set of rules for selecting an alternative serving site when a preferred serving site of the serving sites 104 is down.

In still another example, the database engine 328 can store in the data store(s) 346 a serving-site profile for each of the serving sites 104. For a given serving site, the serving-site profiles can identify the site and indicate endpoint-configuration requirements for endpoints utilizing that serving site. The serving-site profiles can indicate, for example, a required firmware version (or range of versions), a required version of application software (or range of versions), combinations of same and/or the like.

It should be appreciated that the foregoing description of data that can be stored in the data store(s) 346 is merely for illustrative purposes. The data store(s) 346 can store any profiles or information related to serving sites such as the serving sites 104 of FIG. 1, communication managers such as the communication managers 106 of FIG. 1, application servers such as the application server(s) 114 of FIG. 1, administrators and other users, communication endpoints such as the communication endpoint(s) 102 of FIG. 1, management hierarchies such as lines of business or other groupings, combinations of same and/or the like. In some implementations, the database engine 328 can be integrated with directory services utilized by an enterprise (e.g., via Lightweight Directory Access Protocol (LDAP)).

In some embodiments, the replicator 344 can maintain a high-availability, disaster recovery (HADR) database instance in the data store(s) 346. In various embodiments, the HADR database instance can be synchronized with one or more other databases in the data store(s) 346. In some embodiments, the endpoint manager 308 can operate and perform endpoint switchover and recovery while its primary database is down. In various implementations, the HADR backup database instance can be started by an administrator, super user or other user to restore system operation upon failure of the primary database.

In certain embodiments, the administration module 330 can be a central administration process that manages the endpoint manager 308. In general, the administration module 330 can start/stop processes, display process status/memory usage and ping other application processes for validation. In some implementations, the administration module 330 can be configured to run with one or multiple instances on any local or remote nodes. Advantageously, in some implementations, the failover of the administration module 330 can be transparent so as to not impact functionality of the endpoint manager 308.

In certain embodiments, the administration module 330 can further allow administrators, super users or other users to remotely manage application servers such as the application server(s) 114, application services such as the application services 348 and/or other components. In an example, the administration module 330 can be, or include, a three-tier enterprise web application. According to this example, the administration module can provide streamlined access to the endpoint manager 308. For example, in some implementation, one or more instances of the administration server (or a component thereof) can be configured for each of the application server(s) 114 of FIG. 1.

In certain embodiments, the event module 332 can provide the logging and reporting facilities. For example, the event module 332 can write log data, or filtered log data, to global log files. In some implementations, if the event module 332 is unavailable, applications and processes can log and report issues to local log files until the event module 332 becomes available. In certain embodiments, the event module 332 can be configured to run with one or multiple instances on any local or remote nodes. The failover of the event module 332 can be transparent so as to not impact functionality of the endpoint manager 308. For example, one or more instances of the event module 332 can be configured for each of the application server(s) 114 of FIG. 1. In many cases, the application server(s) 114 can load balance event reports among each instance of the event module 332 via an internal process priority argument list that is defined in process configuration and loaded from a database (e.g., in the data store(s) 346) during server initialization.

In certain embodiments, the system manager 334 provides access to system administration. For example, in some implementations, the system manager 334 can reset communication endpoints such as the communication endpoints 102 of FIG. 1. In some embodiments, the system manager 334 can be configured to run with one or multiple instances of an application server such as the application server(s) 114 of FIG. 1. In some implementations, failover of the system manager 334 can be transparent so as to not impact functionality of the endpoint manager 308. For example, one or more instances of the system manager 334 can be configured for each of the application server(s) 114 of FIG. 1. In some embodiments, transaction loading can balanced among all instances of the system manager 334 through a priority argument list that is defined in process configuration and loaded from a database (e.g., in the data store(s) 346) during server initialization.

In certain embodiments, the telephony engine 336 provides access to endpoint telephony state information using, for example, remote method invocation. In some implementations, the telephony engine 336 can provide functionality for communicating with digital communication services provided, for example, by the serving sites 104 of FIG. 1. In an example, the telephony engine 336 can issue commands to query and/or control communication endpoints such as the communication endpoints 102 of FIG. 1. The telephony engine 336 can provide managed commands and forced methods to control the communication endpoints 102. In some cases, the forced command can check for endpoint meta-state (e.g., active or idle) and only issue the command when a given communication endpoint is active. In other cases, such checks can be admitted. In some embodiments, the administration module 330, the telephony engine 336 or another component can provide a dashboard or console that makes real-time endpoint meta-state information (e.g. active or idle) visible to administrators, super users or other users prior to commands being issued.

The telephony engine 336 can be configured to run with one or multiple instances on local or remote nodes. In some implementations, failover of the telephony engine 336 can be transparent so as to not impact functionality of the endpoint manager 308. For example, one or more instances of the telephony engine 336 can be configured for each of the application server(s) 114 of FIG. 1. In some embodiments, transaction loading can balanced among all instances of the telephony engine 336 through a priority argument list that is defined in process configuration and loaded from a database (e.g., in the data store(s) 346) during server initialization.

The file server 340 can access and maintain configurations 342. In some embodiments, the configurations 342 can include one or more sets of files such as, for example, settings files, firmware files, security certificates, application software files, installation script files for any of the foregoing, combinations of same and/or the like. In certain embodiments, the file server 340 can vend configurations that a given communication endpoint needs to connect to a specific serving site.

Figure 4:
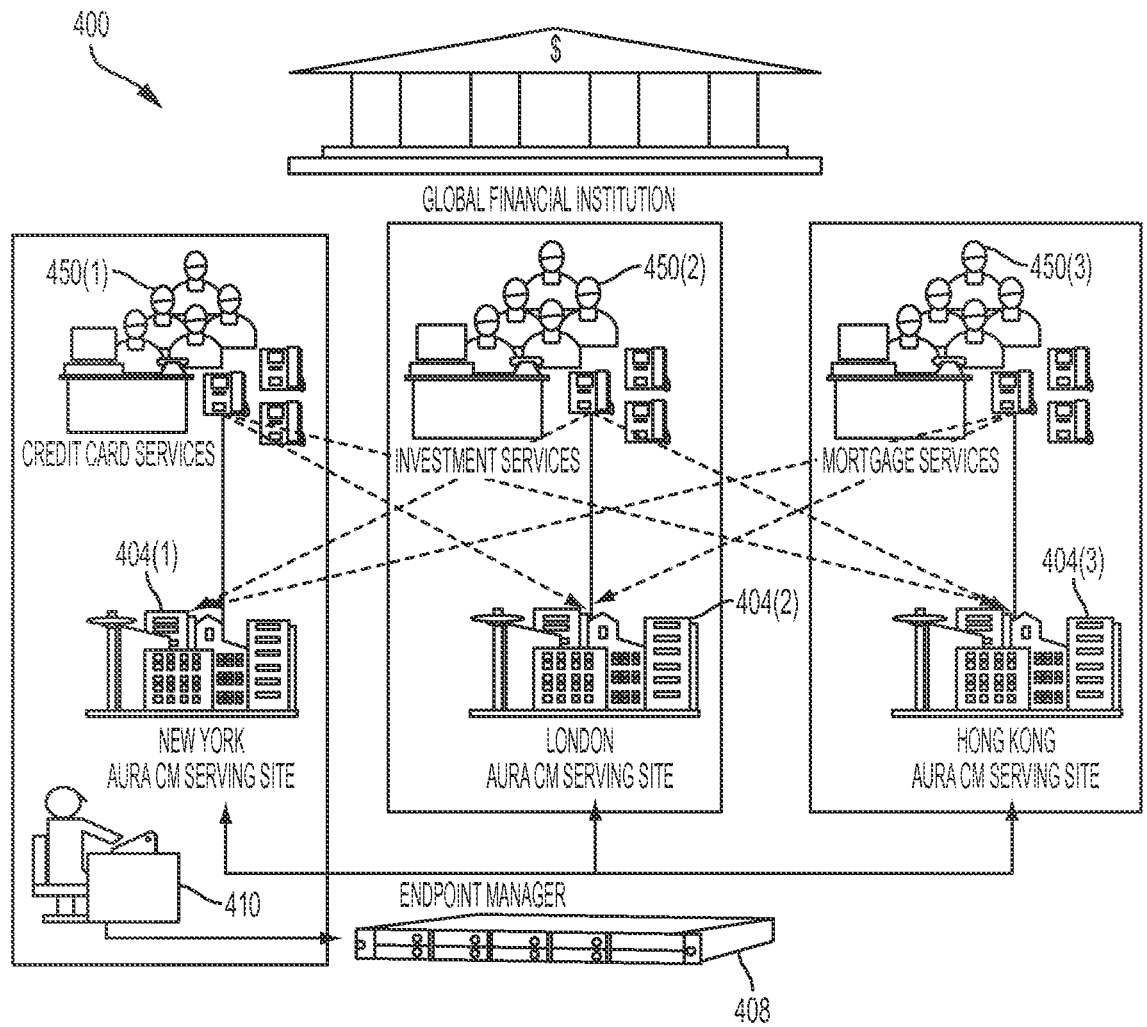
FIG. 4 illustrates an example of an endpoint-management hierarchy.

FIG. 4 it an example of an endpoint-management hierarchy 400. The endpoint-management hierarchy 400 includes example endpoint categories 450(1), 450(2) and 450(3) (collectively, example endpoint categories 450), example serving sites 404(1), 404(2) and 404(3) (collectively, example serving sites 404), a user computer system 410 and an endpoint manager 408. In general, the endpoint manager 408 can operate as described in relation to the endpoint manager 108 of FIG. 1 and/or the endpoint manager 308 of FIG. 3. The user computer system 410 can operate as described in relation to the user system(s) 110 of FIG. 1.

More particularly, in the illustrated embodiment, the endpoint manager 408 can configure each of the example endpoint categories 450 to be assigned to, or receive digital communication services from, any one of the serving sites 404. In that way, endpoints belonging to the endpoint categories 450 can be registered to receive digital communication services from the assigned serving site. In certain cases, assignments can be initiated by the endpoint manager 408 and/or the user computer system 410. Additionally, in certain embodiments, a particular category can be triggered so as to dynamically assign the serving site to all communication endpoints of the particular category.

Figure 5:
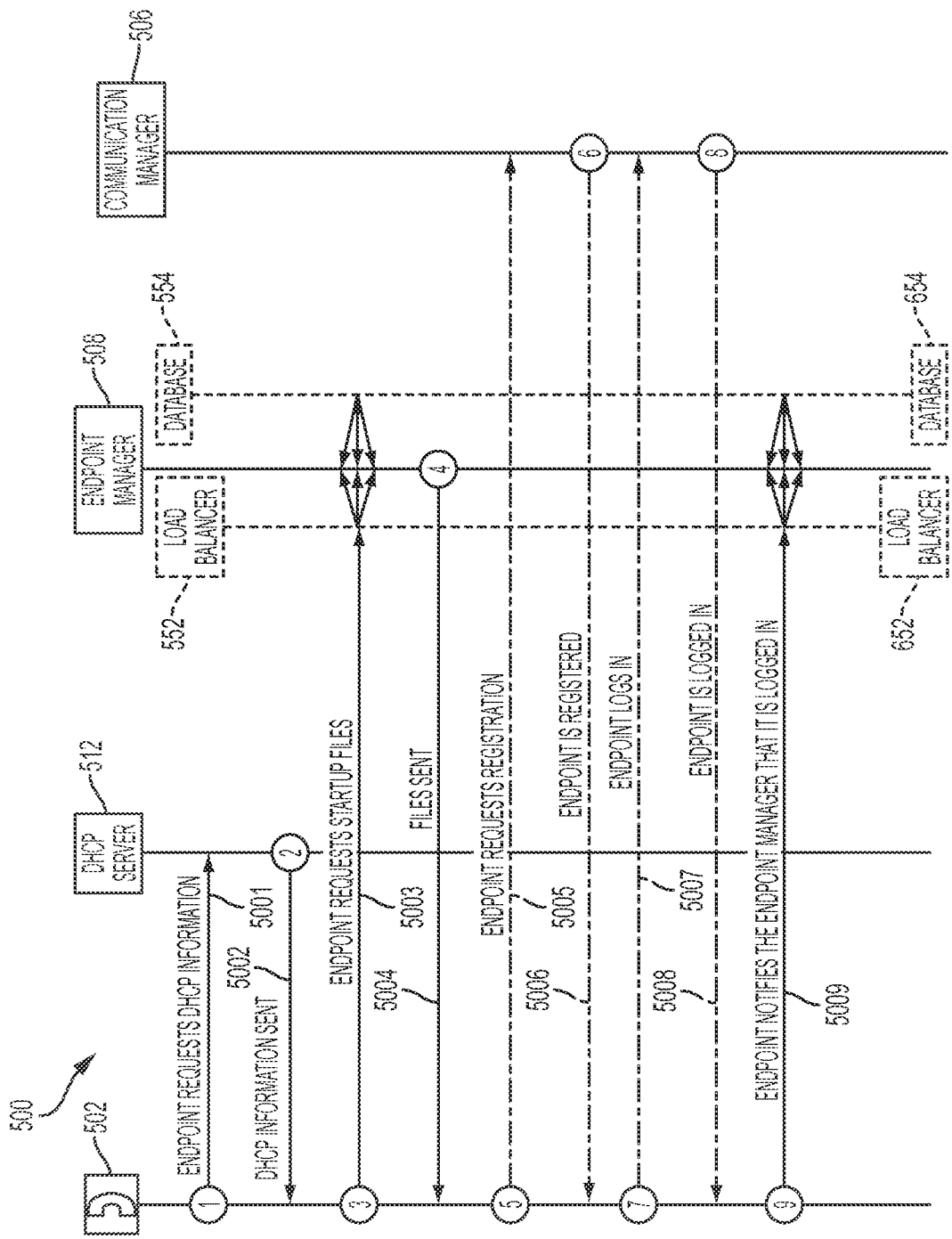
FIG. 5 illustrates an example endpoint initialization process.

FIG. 5 illustrates an example endpoint initialization process 500. In certain embodiments, the process 500 can be used in cases where an endpoint is known to an endpoint manager, for example, as evidenced by the existence of an endpoint profile. In the illustrated embodiment, the process 500 involves a communication endpoint 502, a DHCP server 512, an endpoint manager 508, a load balancer 552, a database 554 and a communication manager 506. In general, the communication endpoint 502, the DHCP server 512 and the communication manager 506 can operate as described with respect to the communication endpoints 102, the DHCP server(s) 112 and the communication managers 106, respectively, of FIG. 1. In a typical embodiment, the endpoint manager 508 can operate as described with respect to the endpoint managers 108 of FIG. 1 and the endpoint manager 308 of FIG. 3. In certain embodiments, the database 554 can be a primary database housed in a data store such as, for example, the data store(s) 346 of FIG. 3.

At 5001, the communication endpoint 502 requests that the DHCP server 512 provide certain information such as, for example, a network identifier of the endpoint manager 508 or a component thereof. For example, in some embodiments, the network identifier can be an IP address, a fully-qualified domain name, a uniform resource locator (URL), combinations of same and/or the like. At 5002, the DHCP server 512 returns the requested information to the communication endpoint 502.

At 5003, the communication endpoint 502, using the information returned from the DHCP server 512, requests endpoint configurations from the endpoint manager 508 (or a component thereof). The requested endpoint configurations can include, for example, settings files, security profiles and certificates, firmware files, application software files, installation script files, combinations of same and/or the like. In general, 5003 can further include the endpoint manager 508 determining, from an endpoint profile of the communication endpoint 502 in the database 554, which serving site and corresponding communication manager will be providing digital communication service to the communication endpoint 502. For purposes of the example of FIG. 5, the corresponding communication manager is the communication manager 506. Further, 5003 can include determining, from a serving-site profile in the database 554, endpoint-configuration requirements of the communication manager 506.

At 5004, the endpoint manager 508 sends to the communication endpoint 502 configurations that satisfy the endpoint-configuration requirements of the communication manager 506. The configurations can include, for example, a firmware file, a security profile, security certificate(s), an application software file, a settings file, a script file for installing any of the foregoing, combinations of same and/or the like. The settings file can include, for example, a reference to the communication manager 506 and/or its corresponding serving site. In various embodiments, the configurations can be retrieved from stored configurations such as the configurations 342 of FIG. 3. In some embodiments, prior to at least a portion of the configurations being sent to the communication endpoint 502, the endpoint manager 508 can determine whether new configurations are needed. In these embodiments, if certain configurations are not needed (e.g., because the communication endpoint 502 already has satisfactory firmware and/or application software), the endpoint manager 508 can omit sending such configurations.

At 5005, the communication endpoint 502 sends a registration request to the communication manager 506. At 5006, the communication endpoint 502 receives a registration confirmation from the communication manager 506. At 5007, the communication endpoint 502 logs into an endpoint IP address, MAC address and/or telephone extension associated with a user of the communication endpoint 502. Responsive to successful login, at 5008, the communication endpoint 502 receives a login confirmation from the communication manager 506. At 5009, the communication endpoint 502 notifies the endpoint manager 508 of the successful login, at which point the endpoint manager 508 can log the successful login in the database 554.

Figure 6:
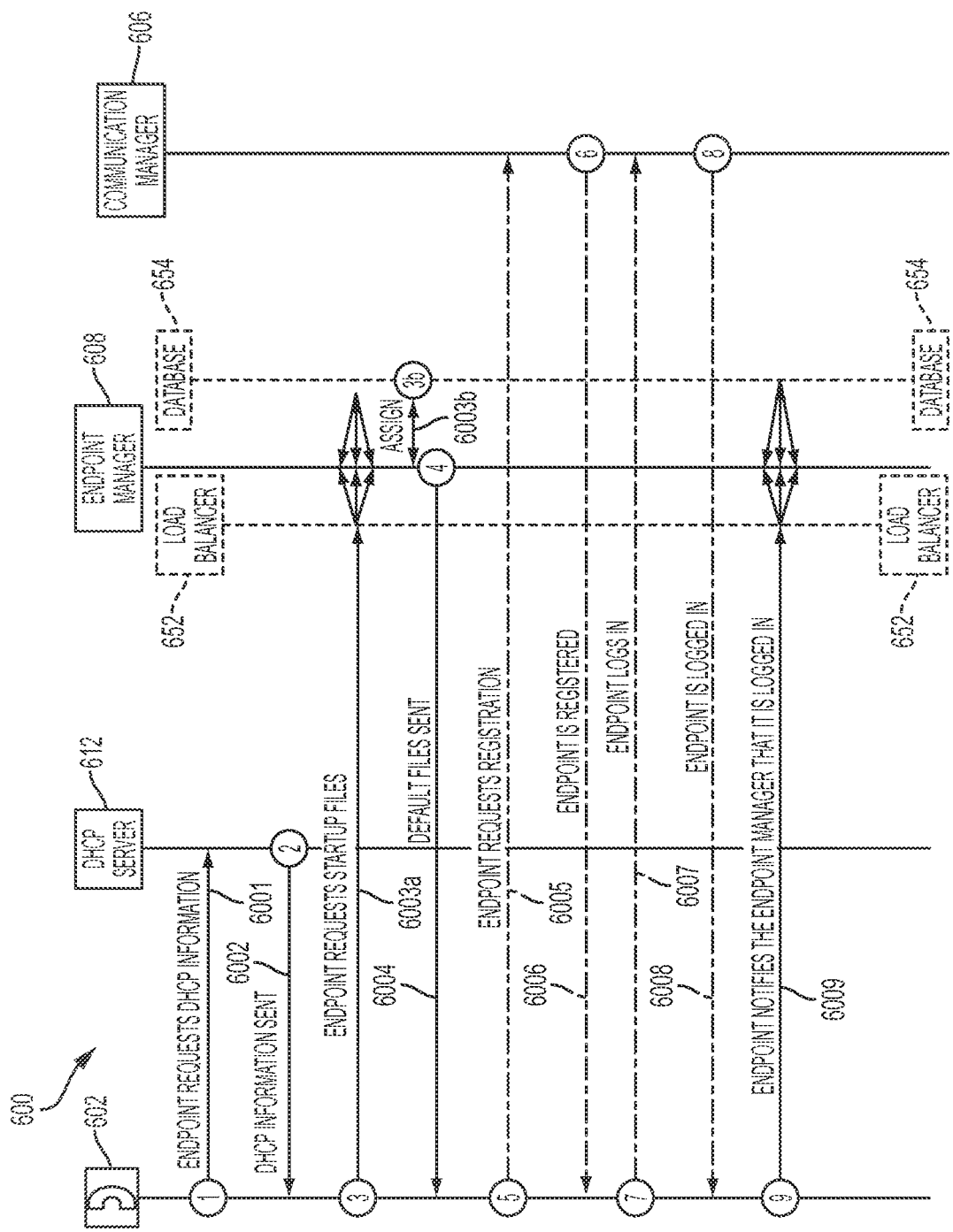
FIG. 6 illustrates an example endpoint initialization process.

FIG. 6 illustrates an example endpoint initialization process 600. In certain embodiments, the process 600 can be used when an endpoint is not known by an endpoint manager, for example, as a result of no endpoint profile existing for the endpoint. In the illustrated embodiment, the process 600 involves a communication endpoint 602, a DHCP server 612, an endpoint manager 608, a load balancer 652, a database 654 and a communication manager 606. In general, the communication endpoint 602, the DHCP server 612 and the communication manager 606 can operate as described with respect to the communication endpoints 102, the DHCP server(s) 112 and the communication managers 106, respectively, of FIG. 1. In a typical embodiment, the endpoint manager 608 can operate as described with respect to the endpoint managers 108 of FIG. 1 and the endpoint manager 308 of FIG. 3. In certain embodiments, the database 654 can be a primary database housed in a data store such as, for example, the data store(s) 346 of FIG. 3.

At 6001, the communication endpoint 602 requests that the DHCP server 612 provide certain information such as, for example, a network identifier of the endpoint manager 608 or a component thereof. For example, in some embodiments, the network identifier can be an address, a fully-qualified domain name, a uniform resource locator (URL), combinations of same and/or the like. At 6002, the DHCP server 612 returns the requested information to the communication endpoint 602.

At 6003*a*, the communication endpoint 602, using the information returned from the DHCP server 612, requests endpoint configurations from the endpoint manager 608 (or a component thereof). The requested endpoint configurations can include, for example, settings files, security profiles, security certificates, firmware files, software files, installation script files, combinations of same and/or the like. In general, 6003*a* can further include the endpoint manager 608 attempting to determine, from an endpoint profile of the communication endpoint 602 in the database 654, which serving site and corresponding communication manager will be providing digital communication service to the communication endpoint 602. In the illustrated embodiment, the communication manager is either not known, for example, because no category of an endpoint-management hierarchy has been specified for the communication endpoint 602.

At 6003*b*, responsive to the communication manager (and corresponding serving site) of the communication endpoint 602 not being known, the endpoint manager 608 assigns a default serving site and corresponding communication manager to the communication endpoint 602. For purposes of the example of FIG. 6, the corresponding communication manager is the communication manager 606. Further, 6003*b* can include determining, from a serving-site profile in the database 654, endpoint-configuration requirements of the communication manager 606.

At 6004, the endpoint manager 608 sends to the communication endpoint 602 configurations that satisfy the endpoint-configuration requirements of the communication manager 606. The configurations can include, for example, a firmware file, a security profile, one or more security certificates, a software file, a settings file, a script file for installing any of the foregoing, combinations of same and/or the like. The settings file can include, for example, a reference to the communication 606 and/or its corresponding serving site. In various embodiments, the configurations can be retrieved from stored configurations such as the configurations 342 of FIG. 3. In some embodiments, prior to at least a portion of the configurations being sent to the communication endpoint 602, the endpoint manager 608 can determine whether new configurations are needed. In these embodiments, if certain configurations are not needed (e.g., because the communication endpoint 602 already has satisfactory firmware and/or application software), the endpoint manager 608 can omit sending such configurations.

At 6005, the communication endpoint 602 sends a registration request to the communication manager 606. At 6006, the communication endpoint 602 receives a registration confirmation from the communication manager 606. At 6007, the communication endpoint 602 logs into a telephone extension associated with a user of the communication endpoint 602. Responsive to successful login, at 6008, the communication endpoint 602 receives a login confirmation from the communication manager 606. At 6009, the communication endpoint 602 notifies the endpoint manager 608 of the successful login, at which point the endpoint manager 608 can log the successful login in the database 654.

Figure 7:
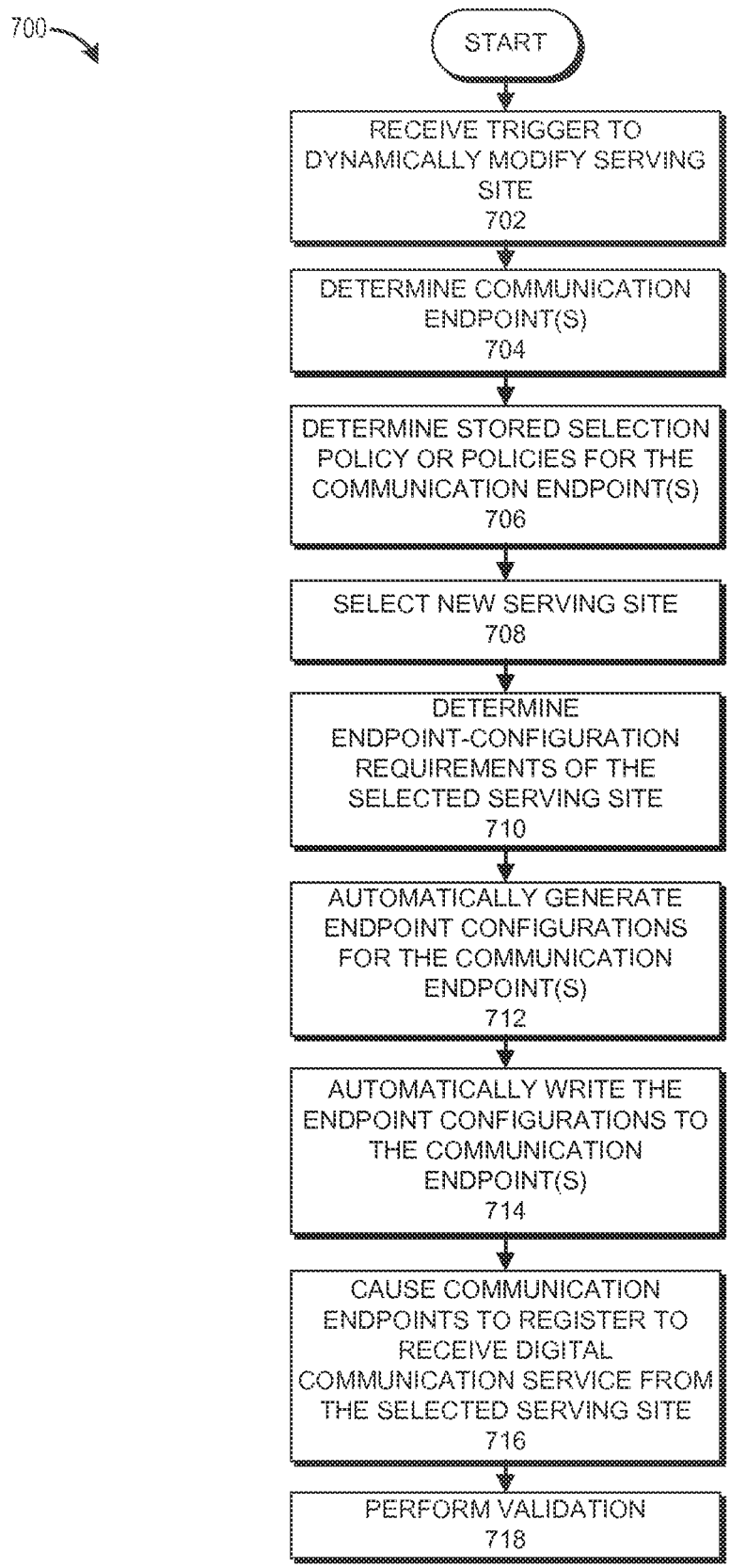
FIG. 7 illustrates an example of a process for dynamically modifying serving sites assigned to communication endpoints.

FIG. 7 illustrates an example of a process 700 for dynamically modifying serving sites assigned to communication endpoints. In a typical embodiment, when the process 700 is executed, an initialization process such as the process 500 or the process 600 has previously executed. The process 700 can be implemented by any system that can access one or more data sources. For example, the process 700, in whole or in part, can be implemented by any component described with respect to FIGS. 1-6. Although any number of systems, in whole or in part, can implement the process 700, to simplify discussion, the process 700 will be described in relation to specific systems or subsystems of the system 100 and/or the endpoint manager 308 of FIG. 3.

At block 702, the endpoint manager 308 receives a trigger to dynamically modify a serving site of one or more of the communication endpoints 102 of FIG. 1. In a typical embodiment, the communication endpoints 102 are each registered to receive digital communication service, such as VoIP service, from a particular serving site of the serving sites 104 of FIG. 1.

The trigger to dynamically modify a serving site can relate to a single communication endpoint or a group of communication endpoints. For example, the group can correspond to category of an endpoint-management hierarchy such as, for example, a line of business. In a more particular example, a line of business, or category, of "credit card services" could have a set of child nodes which correspond to communication endpoints belonging to or associated with users in that line of business (or category). According to this example, the trigger could be received in relation to the line of business of "credit card services" such that all child nodes of that line of business would be affected by the trigger. In some cases, the trigger can be received as a result of a failure of a serving site, an endpoint power reset, cable disconnection, network failure, a failure of that serving site's communication manager, other failures, combinations of same and/or the like. In other cases, an administrator using the user system(s) 110 of FIG. 1 can cause the trigger via the administration module 330 of FIG. 3.

At block 704, the endpoint manager 308 determines communication endpoint(s) that are subject to the trigger. For example, if the trigger specifies particular communication endpoint(s) by name or other identifier, the endpoint manager 308 can determine those communication endpoints to be subject to the trigger. By way of further example, if the trigger relates to a particular category of an endpoint-management hierarchy, the block 704 can include the endpoint manager 308 determining, from the data store(s) 346, which communication endpoints belong to that category.

At block 706, the endpoint manager 308 determines a stored selection policy or policies for the communication endpoints which are subject to the trigger. In certain embodiments, the block 706 can include accessing endpoint profiles and/or category profiles of the type described above. In an example, the selection policy can be specified in an endpoint profile for each endpoint and/or in a category specified for a category of communication endpoints. In certain embodiments, selections made in profiles for particular endpoints can take precedence over selections made in profiles for particular endpoint categories in an endpoint-management hierarchy.

At block 708, the endpoint manager 308 selects a new serving site according to the stored selection policy or policies. At block 710, the endpoint manager 308 determines endpoint-configuration requirements of the new serving site (or, more specifically, of a corresponding communication manager at the serving site). In certain embodiments, the endpoint-configuration requirements can be determined as described in relation to FIGS. 5-6. At block 712, the endpoint, manager 308 automatically generates endpoint configurations that satisfy the endpoint-configuration requirements of the new serving site. In certain embodiments, the block 712 can include accessing and retrieving configurations stored in the configurations 342.

At block 714, the endpoint manager 308 automatically writes the endpoint configurations to the communication endpoints which are subject to the trigger. In some embodiments, prior to at least a portion of the configurations being sent to the communication endpoints, the endpoint manager 308 can determine whether new configurations are needed. In these embodiments, if certain configurations are not needed (e.g., because the communication endpoints already have satisfactory firmware and/or application software), the endpoint manager 308 can omit sending such configurations.

At block 716, the endpoint manager 308 causes the communication endpoints which are subject to the trigger to register to receive digital communication service from the new serving site. In various embodiments, the block 716 can include causing the communication endpoints to perform functionality described with respect to 5005-5009 of FIG. 5.

At block 718, validation can be performed. In general, validation can result in confirmation that registration was successful and that the new serving site is providing digital communication service to each of the communication endpoints subject to the trigger. In some embodiments, the validation can include the communication endpoints automatically sending a confirmation message to the endpoint manager 308. In addition, or alternatively, the validation can include the endpoint manager 308 affirmatively requesting such confirmation, for example, by polling the communication endpoints and/or the new serving site. In some embodiments, the block 718 can be omitted.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method comprising, by a computer system:
   receiving a trigger to modify a serving site of a communication endpoint, wherein the communication endpoint is registered to receive digital communication service from a first serving site;
   accessing a stored serving-site selection policy applicable to the communication endpoint;
   selecting a second serving site for the communication endpoint from among a plurality of alternative serving sites, wherein the selection is based, at least in part, on the stored serving-site selection policy;
   determining endpoint-configuration requirements of the second serving site based, at least in part, on a stored profile of the second serving site;
   writing, to the communication endpoint, endpoint configurations that satisfy the endpoint-configuration requirements of the second serving site; and
   causing the communication endpoint to register to receive digital communication service from the second serving site in place of the first serving site.

2. The method of claim 1, comprising:
   receiving a trigger to modify a serving site in relation to a specified node of an endpoint-management hierarchy;
   determining communication endpoints that are child nodes of the specified node in the endpoint-management hierarchy, wherein the communication endpoints are registered to receive digital communication service from an initial serving site;
   determining a stored serving-site selection policy applicable to the communication endpoints based, at least in part, on the specified node of the endpoint-management hierarchy;

accessing the stored serving-site selection policy applicable to the communication endpoints;
selecting a replacement serving site for the communication endpoints based, at least in part, on the stored serving-site selection policy applicable to the communication endpoints;
determining endpoint-configuration requirements of the replacement serving site based, at least in part, on a stored profile of the replacement serving site;
writing, to the communication endpoints, endpoint configurations that satisfy the endpoint-configuration requirements of the replacement serving site; and
causing the communication endpoints to register to receive digital communication service from the replacement serving site in place of the initial serving site.

3. The method of claim 2, wherein the endpoint configurations of at least one communication endpoint of the communication endpoints are different from the endpoint configurations of at least one other communication endpoint of the communication endpoints.

4. The method of claim 1 comprising, prior to the writing, generating at least a portion of the endpoint configurations, wherein the generating comprises generating a settings file that references the second serving site.

5. The method of claim 1 comprising, prior to the writing, generating at least a portion of the endpoint configurations, wherein the generating comprises accessing a firmware file that satisfies the endpoint-configuration requirements of the second serving site.

6. A system comprising at least one processor, wherein the at least one processor is operable to perform a method comprising:
receiving a trigger to modify a serving site of a communication endpoint, wherein the communication endpoint is registered to receive digital communication service from a first serving site;
accessing a stored serving-site selection policy applicable to the communication endpoint;
selecting a second serving site for the communication endpoint from among a plurality of alternative serving sites, wherein the selection is based, at least in part, on the stored serving-site selection policy;
determining endpoint-configuration requirements of the second serving site based, at least in part, on a stored profile of the second serving site;
writing, to the communication endpoint, endpoint configurations that satisfy the endpoint-configuration requirements of the second serving site; and
causing the communication endpoint to register to receive digital communication service from the second serving site in place of the first serving site.

7. The system of claim 6, the method comprising:
receiving a trigger to modify a serving site in relation to a specified node of an endpoint-management hierarchy;
determining communication endpoints that are child nodes of the specified node in the endpoint-management hierarchy, wherein the communication endpoints are registered to receive digital communication service from an initial serving site;
determining a stored serving-site selection policy applicable to the communication endpoints based, at least in part, on the specified node of the endpoint-management hierarchy;
accessing the stored serving-site selection policy applicable to the communication endpoints;
selecting a replacement serving site for the communication endpoints based, at least in part, on the stored serving-site selection policy applicable to the communication endpoints;
determining endpoint-configuration requirements of the replacement serving site based, at least in part, on a stored profile of the replacement serving site;
writing, to the communication endpoints, endpoint configurations that satisfy the endpoint-configuration requirements of the replacement serving site; and
causing the communication endpoints to register to receive digital communication service from the replacement serving site in place of the initial serving site.

8. The system of claim 7, wherein the endpoint configurations of at least one communication endpoint of the communication endpoints are different from the endpoint configurations of at least one other communication endpoint of the communication endpoints.

9. The system of claim 6, the method comprising, prior to the writing, generating at least a portion of the endpoint configurations, wherein the generating comprises generating a settings file that references the second serving site.

10. The system of claim 6, the method comprising, prior to the writing, generating at least a portion of the endpoint configurations, wherein the generating comprises accessing a firmware file that satisfies the endpoint-configuration requirements of the second serving site.

11. A computer-program product comprising a non-transitory computer-usable medium having computer-readable program code embodied therein, the computer-readable program code adapted to be executed to implement a method comprising:
receiving a trigger to modify a serving site of a communication endpoint, wherein the communication endpoint is registered to receive digital communication service from a first serving site;
accessing a stored serving-site selection policy applicable to the communication endpoint;
selecting a second serving site for the communication endpoint from among a plurality of alternative serving sites, wherein the selection is based, at least in part, on the stored serving-site selection policy;
determining endpoint-configuration requirements of the second serving site based, at least in part, on a stored profile of the second serving site;
writing, to the communication endpoint, endpoint configurations that satisfy the endpoint-configuration requirements of the second serving site; and
causing the communication endpoint to register to receive digital communication service from the second serving site in place of the first serving site.

12. The computer-program product of claim 11, the method comprising:
receiving a trigger to modify a serving site in relation to a specified node of an endpoint-management hierarchy;
determining communication endpoints that are child nodes of the specified node in the endpoint-management hierarchy, wherein the communication endpoints are registered to receive digital communication service from an initial serving site;
determining a stored serving-site selection policy applicable to the communication endpoints based, at least in part, on the specified node of the endpoint-management hierarchy;
accessing the stored serving-site selection policy applicable to the communication endpoints;

selecting a replacement serving site for the communication endpoints based, at least in part, on the stored serving-site selection policy applicable to the communication endpoints;

determining endpoint-configuration requirements of the replacement serving site based, at least in part, on a stored profile of the replacement serving site;

writing, to the communication endpoints, endpoint configurations that satisfy the endpoint-configuration requirements of the replacement serving site; and causing the communication endpoints to register to receive digital communication service from the replacement serving site in place of the initial serving site.

13. The computer-program product of claim 12, wherein the endpoint configurations of at least one communication endpoint of the communication endpoints are different from the endpoint configurations of at least one other communication endpoint of the communication endpoints.

14. The computer-program product of claim 11, the method comprising, prior to the writing, generating at least a portion of the endpoint configurations, wherein the generating comprises generating a settings file that references the second serving site.

15. The computer-program product of claim 11, the method comprising, prior to the writing, generating at least a portion of the endpoint configurations, wherein the generating comprises accessing a firmware file that satisfies the endpoint-configuration requirements of the second serving site.

* * * * *